United States Patent [19]
Lotshaw et al.

[11] Patent Number: 6,021,142
[45] Date of Patent: Feb. 1, 2000

[54] OPTICAL SURFACE TREATMENT

[75] Inventors: William Taylor Lotshaw, Niskayuna; Phillip Randall Staver, Hagaman; Angel Luis Ortiz, Jr., Ballston Spa, all of N.Y.

[73] Assignee: General Electric Company, Schenectady, N.Y.

[21] Appl. No.: 09/079,476

[22] Filed: May 15, 1998

[51] Int. Cl.[7] .......................................... H01S 3/10
[52] U.S. Cl. ................................. 372/21; 372/40
[58] Field of Search ................................ 372/21, 41, 40

*Primary Examiner*—Leon Scott, Jr.
*Attorney, Agent, or Firm*—Patrick K. Patnode; Marvin Snyder

[57] ABSTRACT

A method of hygroscopic optical material fabrication comprising the steps of cutting a hygroscopic optical material to generate an optical substrate of appropriate dimensions and polishing the hygroscopic optical material for appropriate surface figure or surface quality. The cutting and polishing of the hygroscopic optical material is completed while the hygroscopic optical material is isolated from aqueous contamination so as to maintain or increase the damage threshold of the hygroscopic optical material.

26 Claims, No Drawings

OPTICAL SURFACE TREATMENT

This invention was made with Government support under Government Contract No. MDA972-94-30020 awarded by Defense Advanced Research Projects Agency (DARPA). The Government has certain rights to this invention.

BACKGROUND OF THE INVENTION

This invention relates generally to surface and near surface optical treatments and specifically to optical surface treatments for the purpose of reducing susceptibility to optical damage (i.e.. increasing the surface damage thresholds with respect to fluence [Joules/cm$^2$] and intensity [Joules/cm$^2$·sec]).

Contamination of optical surfaces of optical elements by impurities of any origin, for example, particulate debris, adsorbed volatile substances, or environmentally induced chemical derivatives of the parent material, can serve as nucleation sites (microscopic origins of macroscopic damage) under intense optical illumination. Damage is initiated at the nucleation sites due to optical inhomogeneities (variations in the optical properties of the nucleation sites with respect to those of the surrounding parent material), especially optical absorption. In optical absorption, optical energy is converted to highly localized thermal energy that gives rise to stresses exceeding the fracture limit or that chemically decomposes the parent material. Where chemical decomposition results from the interaction between the optical energy and the nucleation sites, a cascade effect can result in which the decomposition products show further increases in optical absorption, and continued optical illumination supports a destructive chain reaction.

Processing the surfaces of optical materials, coating or polishing for example, whose intrinsic damage resistance (the damage resistance of the pure material) is high, to meet optical specifications, must account for the potential of process-induced nucleation sites that reduce the optical damage resistance of the finished optical element. Processes that induce low damage resistance impurities must be modified to reduce or eliminate such induced impurities. One example of such a process is the use of a polishing slurry that reacts chemically with the parent material or results in a change in the structure of the material (e.g. induces a transformation from one crystal structure to another).

Accordingly, there is a desire in the art for a method of optical surface treatment that reduces or eliminates induced impurities.

SUMMARY OF THE INVENTION

A method of hygroscopic optical material fabrication comprising the steps of cutting a hygroscopic optical material to generate an optical substrate of appropriate dimensions and polishing the hygroscopic optical material for appropriate surface figure or surface quality. The cutting and polishing of the hygroscopic optical material is completed while the hygroscopic optical material is isolated from aqueous contamination so as to maintain or increase the damage threshold of the hygroscopic optical material.

DETAILED DESCRIPTION OF THE INVENTION

In a conventional optical material fabrication process, a carrier fluid (typically water used as a wetting agent) facilitates hydration of the surface material layer. This hydrated layer becomes soft and is removed by the abrasive polishing compound through a plastic scratching mechanism. This softening occurs because the mechanical durability of the surface is reduced when the material's constituents are dissolved leaving behind a relatively weak silicaceous skeleton or the like.

In oxide second order nonlinear optical materials that are highly transparent, such as lithium triborate (LiB$_3$O$_5$, also called LBO) contamination of the optical surface or near-surface region with the hydrate LiB$_3$O$_5$·(H$_2$O)$_n$ (where n varies) or decomposition products of the hydrate can result in alteration of the surface and near surface optical properties such that the thermo-optic load-bearing capability and damage susceptibility of the parent material (LiB$_3$O$_5$ for example) are significantly affected. When such materials are processed to optical specification in order to become optical elements in a high power laser system or laser beam relay, contact with water must be limited or controlled to preserve the intrinsic damage resistance of the finished optical element while retaining or improving the intrinsic nonlinear optical properties of the parent material.

For oxide nonlinear crystals, the formation of hydrates (or hydrate decomposition products such as chemically distinct oxides) on the polished surfaces either from ambient water vapor or liquid water in a polishing slurry (during polishing) has been identified as a source of chemical impurities that can alter the damage resistance or functional capability of optical elements fabricated from these materials. Elimination of these impurities, particularly in a nonlinear frequency conversion crystal, has been shown to result in a substantial improvement in the laser damage resistance of the processed optical element.

In accordance with one embodiment of the instant invention, optical polishing is carried out using non-aqueous and water-free solvents or lubricants, and post-process handling of the crystals eliminates or significantly reduces exposure of the nascent pristine surface(s) to free water in any state in order to avoid the formation of a chemically and optically distinct hydrate layer. The post-process handling of the crystal optical element can be accommodated either by isolating the element in a sealed optical cell containing a controlled (water-free) atmosphere, or the exterior surfaces of the finished optical element can be sealed by application of an inert coating material, such as a vapor-deposited dielectric material or a polymer material.

In high average power applications such as non-linear wavelength conversion of the output of long wavelength laser sources to harmonic wavelengths (at optical frequencies that are integral fractions of the laser frequency), coating materials are typically more susceptible to optical damage threshold than optical materials and cannot be used. In these cases, the crystal optic must be isolated from the ambient environment by a sealed optical cell as discussed above.

In one embodiment of the instant invention, for materials in which the material removal rate is too small when an anhydrous agent is used as a wetting agent, a more complicated schedule is implemented. Specifically, polishing is proceeded by alternately using hydrous and anhydrous wetting agents. The last wetting agent used in the last polishing step is an anhydrous one.

The methods of optical polishing and subsequent fabrication of optical elements from hygroscopic oxide nonlinear optical materials such as LiB$_3$O$_5$, LiIO$_3$, LiNbO$_3$, KB$_5$O$_8$·(H$_2$O)$_4$, βBaB$_3$O$_5$, or the like, (hygroscopic materials show a propensity to absorb water and form hydrates, where molecular water is non-covalently bound in the parent material crystal structure) for use in high average power or high peak power laser systems, should be specifically designed to minimize alteration of the physical-chemical properties of the parent materials, especially with respect to the interaction of the finished optical element with laser radiation in its operational environment. The current invention specifically relates to controlling the exposure of hygroscopic optical materials to water in the liquid or vapor state during optical fabrication. The present invention specifically proposes to effect the increased damage thresholds by removing optically absorbing impurities and chemical derivatives of the parent optical material which result from exposure to an ambient atmosphere.

Resistance of hygroscopic optical materials to optical damage is reduced with respect to the intrinsic damage resistance of the pure material due to surface impurities or defects that arise from exposure to water in the liquid or vapor state during optical fabrication.

The fabrication-induced impurities or defects mediate optical damage upon optical illumination by having optical properties that differ from the pure parent material, especially by an increased optical absorptivity at operational optical (or laser) wavelengths and the harmonics or subharmonics of those wavelengths.

The fabrication processes include cutting of the crystalline optical materials to generate an optical substrate of appropriate dimensions and polishing of the optical surfaces (surfaces through which light will travel in the intended function of the optical element) of the substrate for surface figure (flatness/curvature/etc.) or surface quality (area, depth, and number of sites on the optical surfaces that deviate from the specified surface figure).

Impurities or defects that arise from exposure of hygroscopic optical materials to water in any state can be dramatically reduced or eliminated by adopting rigorously non-aqueous solvents, solutions, or suspensions (i.e. uncontaminated by water or "dry") for the purposes of lubrication during cutting/sizing of the material and polishing during the fabrication of optical surfaces on the material. Impurities or defects that arise from exposure of hygroscopic optical materials to water in any state can be dramatically reduced or eliminated by isolating finished optical elements fabricated from such materials in a sealed optical enclosure charged with a water-free inert atmosphere. Hygroscopic optical materials may include for example crystals and glasses, and other hygroscopic optically nonlinear oxide materials used in electro-optic light modulators and optical frequency generation such as $2^{nd}$ or $3^{rd}$ harmonic generation (where the optical frequency generated by the nonlinear crystal when illuminated is an integral multiple of the single applied optical frequency) and parametric frequency generation (where the optical frequency generated by the nonlinear crystal when illuminated is the sum or difference of two applied optical frequencies).

EXAMPLE

Uncoated LBO has an intrinsic damage threshold of $\approx 2$ to $5 \times 10^9$ W·cm$^{-2}$ measured with 10 nanosecond duration pulses. While examining the average power scaling of second harmonic generation (SHG) in non-critically phase matched LBO, it was found that LBO material that routinely experienced contact with ambient atmosphere (and humidity) consistently showed damage at peak intensities $\frac{1}{10}$ that value during high humidity months.

The damage initiated at the exit face of the nonlinear crystal where both the fundamental and harmonic frequencies were present, indicating that the absorption of either the harmonic frequency or the harmonic plus the fundamental frequency near the crystal surface had increased. Since LBO was known to be moderately hygroscopic, several crystals were polished using a dry alcoholic polishing slurry and packaged in a sealed optical cell under a dry nitrogen atmosphere to limit exposure to water vapor. Following non-aqueous repolish, the crystal was mounted in a sealed optical cell with a nitrogen atmosphere. The LBO prepared and mounted in this way showed high damage threshold (operating routinely at fundamental intensity of 1–2 10$^9$ W cm$^{-2}$) regardless of ambient humidity. LBO crystals which had not been repolished by the non-aqueous method to remove impurities continued to show low damage resistance even when mounted in the dry nitrogen optical cell to isolate the crystal from further contamination by water.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of hygroscopic optical material fabrication comprising the following steps:

cutting said hygroscopic optical material to generate an optical substrate of appropriate dimensions; and polishing said hygroscopic optical material for appropriate surface figure or surface quality;

wherein said steps of cutting and polishing of said hygroscopic optical material are completed while said hygroscopic optical material is isolated from aqueous contamination so as to maintain or increase the damage threshold of said hygroscopic optical material.

2. A method in accordance with claim 1, wherein said hygroscopic optical material is an oxide nonlinear optical material.

3. A method in accordance with claim 1, wherein said hygroscopic optical material is selected from the group consisting of $LiB_3O_5$, $LiIO_3$, $LiNbO_3$, $KB_5O_8 \cdot (H_2O)_4$, and $\beta\text{-}BaB_2O_5$.

4. A method in accordance with claim 1, wherein said step of cutting said hygroscopic optical material further comprises utilizing non-aqueous solvents for lubrication during cutting of said hygroscopic optical material.

5. A method in accordance with claim 1, wherein said step of cutting said hygroscopic optical material further comprises utilizing non-aqueous solutions for lubrication during cutting of said hygroscopic optical material.

6. A method in accordance with claim 1, wherein said step of cutting said hygroscopic optical material further comprises utilizing non-aqueous suspensions for lubrication during cutting of said hygroscopic optical material.

7. A method in accordance with claim 1, wherein said step of polishing said hygroscopic optical material further comprises utilizing non-aqueous solvents for lubrication during polishing of said hygroscopic optical material.

8. A method in accordance with claim 1, wherein said step of polishing said hygroscopic optical material further comprises utilizing non-aqueous solutions for lubrication during polishing of said hygroscopic optical material.

9. A method in accordance with claim 1, wherein said step of polishing said hygroscopic optical material further comprises utilizing non-aqueous suspensions for lubrication during polishing of said hygroscopic optical material.

10. A method in accordance with claim 1, further comprising post-process isolating said hygroscopic optical material in a sealed cell having an aqueous free atmosphere.

11. A method in accordance with claim 10, wherein said sealed cell contains a dry nitrogen atmosphere.

12. A method in accordance with claim 1, further comprising post-process isolating said hygroscopic optical material by sealing the exterior surfaces of said hygroscopic optical material with an inert coating material.

13. A method in accordance with claim 12, wherein said inert coating material is a dielectric material.

14. A method in accordance with claim 12, wherein said inert coating material is a polymer material.

15. A method of hygroscopic optical material fabrication comprising the following steps:

cutting said hygroscopic optical material to generate an optical substrate of appropriate dimensions utilizing a hydrous wetting agent;

polishing said hygroscopic optical material to generate an optical substrate of appropriate surface figure or surface quality utilizing a hydrous wetting agent; and repolishing said hygroscopic optical material to generate an optical substrate of appropriate surface figure or surface quality utilizing an anhydrous wetting agent so as to maintain or increase the damage threshold of said hygroscopic optical material.

16. A method in accordance with claim 15, wherein said hygroscopic optical material is an oxide nonlinear optical material.

17. A method in accordance with claim 15, wherein said hygroscopic optical material is selected from the group consisting of $LiB_3O_5$, $LiIO_3$, $LiNbO_3$, $KB_5O_8 \cdot (H_2O)_4$, and $\beta\text{-}BaB_3O_5$.

18. A method in accordance with claim 15, further comprising post-process isolating said hygroscopic optical material in a sealed cell having an aqueous free atmosphere.

19. A method in accordance with claim 18, wherein said sealed cell contains a dry nitrogen atmosphere.

20. A method in accordance with claim 15, further comprising post-process isolating said hygroscopic optical material by sealing the exterior surfaces of said hygroscopic optical material with an inert coating material.

21. A method in accordance with claim 20, wherein said inert coating material is a dielectric material.

22. A method in accordance with claim 20, wherein said inert coating material is a polymer material.

23. An optical substrate comprising:

a hygroscopic optical material cut and polished utilizing an anhydrous wetting agent so as to maintain or increase the damage threshold of said hygroscopic optical material.

24. An optical substrate in accordance with claim 23, wherein said hygroscopic optical material is selected from the group consisting of $LiB_3O_5$, $LiIO_3$, $LiNbO_3$, $KB_5O_8 \cdot (H_2O)_4$, and $\beta\text{-}BaB_3O_5$.

25. A high power laser source comprising:

an optical substrate of a hygroscopic optical material cut and polished utilizing an anhydrous wetting agent so as to maintain or increase the damage threshold of said hygroscopic optical material.

26. A high power laser source in accordance with claim wherein said hygroscopic optical material is selected from the group consisting of $LiB_3O_5$, $LiIO_3$, $LiNbO_3$, $KB_5O_8 \cdot (H_2O)_4$, and $\beta\text{-}BaB_3O_5$.

* * * * *